United States Patent
Dugan et al.

(10) Patent No.: US 7,329,050 B1
(45) Date of Patent: Feb. 12, 2008

(54) TAPERED, SINGLE-MODE OPTICAL CONNECTOR

(75) Inventors: Mark A. Dugan, Ann Arbor, MI (US); Ali A. Said, Ann Arbor, MI (US); Philippe Bado, Ann Arbor, MI (US)

(73) Assignee: Translume, Inc., Ann Arbor, MI (US)

( * ) Notice: Subject to any disclaimer, the term of this patent is extended or adjusted under 35 U.S.C. 154(b) by 0 days.

(21) Appl. No.: 11/372,609

(22) Filed: Mar. 10, 2006

(51) Int. Cl.
*G02B 6/38* (2006.01)

(52) U.S. Cl. ............................ 385/55; 385/44; 385/45

(58) Field of Classification Search ............... 385/15, 385/25, 43, 55, 73, 74, 93, 94, 24, 59, 88–91, 385/27–29, 44, 45, 46
See application file for complete search history.

(56) References Cited

U.S. PATENT DOCUMENTS

| | | | |
|---|---|---|---|
| 4,421,383 A | 12/1983 | Carlsen | |
| 4,701,011 A | 10/1987 | Emkey et al. | |
| 4,836,637 A | 6/1989 | Poorman et al. | |
| 4,898,450 A | 2/1990 | Jannson et al. | |
| 4,953,938 A | 9/1990 | Buhrer et al. | |
| 5,361,317 A * | 11/1994 | Hartman et al. | 385/43 |
| 5,594,825 A | 1/1997 | Kawasaki et al. | |
| 6,012,852 A | 1/2000 | Kadar-Kallen et al. | |
| 6,580,850 B1 * | 6/2003 | Kazarinov et al. | 385/28 |
| 6,628,877 B2 * | 9/2003 | Dugan et al. | 385/129 |
| 6,632,025 B2 | 10/2003 | Ukrainczyk | |
| 6,655,850 B2 | 12/2003 | Mann et al. | |
| 6,736,547 B2 | 5/2004 | Stevens et al. | |
| 6,768,850 B2 | 7/2004 | Dugan et al. | |
| 7,006,738 B2 * | 2/2006 | Grabbe | 385/52 |
| 7,031,567 B2 * | 4/2006 | Grinderslev et al. | 385/34 |
| 7,065,274 B2 * | 6/2006 | Miller | 385/43 |
| 2002/0110328 A1 * | 8/2002 | Bischel et al. | 385/49 |
| 2004/0071420 A1 | 4/2004 | Sezerman et al. | |

(Continued)

FOREIGN PATENT DOCUMENTS

WO    WO-02/16070    2/2002

OTHER PUBLICATIONS

Amitay, "Optical Fiber Tapers—A Novel Approach to Self-Aligned Beam Expansion and Single-Mode Hardware," *Journal of Lightwave Technology*, vol. 5, p. 70-76 (1987).

(Continued)

*Primary Examiner*—Brian Healy
*Assistant Examiner*—Hung Lam
(74) *Attorney, Agent, or Firm*—Lempia Braidwood LLC

(57) ABSTRACT

Disclosed herein are an optical device, such as a connector or mode enlarger, and a method of fabricating the device. The disclosed device includes an optical medium having a first face for, e.g., permanent attachment to a waveguide, a second face for, e.g., a non-permanent connection, and a region between the first and second faces. A non-fiber, connector waveguide is disposed in the region to propagate the single-mode signal from the first face to the second face. The connector waveguide is optically matched to the waveguide at the first face to receive the single-mode signal carried by the waveguide. The connector waveguide includes a taper section such that the connector waveguide is enlarged at the second face to support an expanded beam of the single-mode signal for propagation through the non-permanent connection. In some cases, the taper section receives the single-mode signal from an input section of the connector waveguide to generate an expanded or narrowed beam of the single-mode signal via discrete modulation of waveguide cross-section. An output section of the connector waveguide then supports the propagation of the expanded or narrowed beam of the single-mode signal through the non-permanent connection.

30 Claims, 14 Drawing Sheets

U.S. PATENT DOCUMENTS

2004/0258359 A1    12/2004    Corkum et al.
2006/0051021 A1*    3/2006    Braunisch et al. ............ 385/33
2006/0067636 A1*    3/2006    Bludau et al. ............. 385/135

OTHER PUBLICATIONS

Chanclou, et al., "Collective Microoptics on Fiber Ribbon for Optical Interconnecting Devices," *Journal of Lightwave Technology*, vol. 17, pp. 924-928 (1999).

Chanclou, et al., "Design and Performance of Expanded Mode Fiber Using Microoptics," *Journal of Lightwave Technology*, vol. 20, pp. 836-842 (2002).

Chanclou, et al., "Expanded Single Mode Fiber," OFC 2001, WDD4, Anaheim, Mar. 2001.

Chanclou, et al., "Expanded Single-Mode Fiber Using Graded Index Multimode Fiber," *Optical Engineering*, vol. 43, pp. 1634-1642 (2004).

Chang, et al., "Design of Low-Loss Tapered Waveguides Using the Telescope Structure Compensation," *IEEE Photonics Technology Letters*, pp. 1378-1380 (2003).

Davis, et al. "Writing Waveguides in Glass with a Femtosecond Laser," *Optics Letters*, vol. 21, p. 1729-1731 (1996).

Fritze, et al., "3D Mode Converters for SOI Integrated Optics," *SOI Conference*, IEEE International 2002, pp. 165-166 (2002).

Furuya, et al., "Low Loss Splicing of Single-Mode Fibers by Tapered-Butt-Joint Method," *IEICE Transactions*, vol. E61-E, pp. 957-961 (1978).

Hanaizumi, et al., "Fabrication of an Expanded Core Fiber Having MFD of 40 µm Preserving Outer Diameter," *IEEE Photonics Technology Letters*, vol. 6, pp. 842-844 (1994).

Hiramatsu, et al., "Laser-Written Optical-Path Redirected Waveguide Device for Optical Back-Plane Interconnects," *IEEE Photonics Technology Letters*, vol. 16, pp. 2075-2077 (2004).

Kowalevicz, et al., "Three-Dimensional Photonic Devices Fabricated in Glass by Use of a Femtosecond Laser Oscillator," *Optics Letters*, vol. 30. pp. 1060-1062 (May 2005).

Lee, et al., "Beam Propagation Analysis for Tapered Waveguides: Taking Account of the Curved Phase-Front Effect in Paraxial Approximation," *Journal of Lightwave Technology*, vol.15, pp. 2183-2189 (1997).

Lee, et al., "Design and Analysis of Completely Adiabatic Tapered Waveguides by Conformal Mapping," *Journal of Lightwave Technology*, vol. 15, pp. 403-410 (1997).

Lee, et al., "Mode Transformer for Miniaturized Optical Circuits," *Optics Letters*, vol. 30, pp. 498-500 (Mar. 2005).

Milton, et al., "Mode Coupling in Optical Waveguide Horns," *IEEE Journal of Quantum Electronics*, vol. 13, p. 828-835 (1977).

Mitomi, et al., "Design of a Single-Mode Tapered Waveguide for Low-Loss Chip-to-Fiber Coupling," *IEEE Journal of Quantum Electronics*, vol. 30, pp. 1787-1793 (1994).

Nasu, et al., "Low-Loss Waveguides Written with a Femtosecond Laser for Flexible Interconnection in a Planar Light-Wave Circuit," *Optics Letters*, vol. 30, pp. 723-725 (Apr. 2005).

Ohtera, et al., "Numerical Analysis of Eigenmodes and Splice Losses of Thermally Diffused Expanded Core Fibers," *Journal of Lightwave Technology*, vol. 17, pp. 2675-2682 (1999).

Shiefman, "Insertion Loss Comparison of Microcollimators Used to Propagate Light in and out of Single-Mode Fibers," *Optical Engineering*, vol. 43, pp. 1927-1937 (2004).

Shigihara, et al., "Modal Field Transforming Fiber Between Dissimilar Waveguides," *Journal of Applied Physics*, vol. 60, p. 4293-4296 (1986).

Shiraishi, et al., "Beam Expanding Fiber Using Thermal Diffusion of the Dopant," *Journal of Lightwave Technology*, vol. 8, p. 1151-1161, 1990.

Shiraishi, et al., "Light-Propagation Characteristics in Thermally Diffused Expanded Core Fibers," *Journal of Lightwave Technology*, vol. 11, pp. 1584-1591 (1993).

Suchoski, Jr., et al., "Constant-Width Variable Index Transition for Efficient Ti-LiNbO3 Waveguide-Fiber Coupling," *Journal of Lightwave Technology*, vol. 5, pp. 1246-1251 (1987).

Taylor, et al., "Femtosecond Laser Fabrication of Nanostructures in Silica Glass," *Optics Letters*, vol. 28, pp. 1043-1045 (2003).

Taylor, et al., "Ultra-High Resolution Index of Refraction Profiles of Femtosecond Laser Modified Silica Structures," *Optics Express*, vol. 11, pp. 775-781 (2003).

Totoku Electric Co., Ltd., "Optical Products | TEC (Thermally-defused Expanded Core) Fiber," http://www.totoku.com/products/optical_product/appli/tec/, pp. 1-2 (2005).

Yanagawa, et al., "Index-and-Dimensional Taper and Its Application to Photonic Devices," *Journal of Lightwave Technology*, vol. 10, pp. 587-591 (1992).

Yamaguchi, et al., "Low-Loss Spot-Size Transformer by Dual Tapered Waveguides (DTW-SST)," *Journal of Lightwave Technology*, vol. 8, pp. 587-593 (1990).

\* cited by examiner

TAPERED, SINGLE-MODE OPTICAL CONNECTOR

STATEMENT REGARDING FEDERALLY SPONSORED RESEARCH OR DEVELOPMENT

This invention was made with government support under Contract No.: FA8650-04-C-3413 awarded by the Secretary of the United States Air Force. The government has certain rights in the invention.

BACKGROUND OF THE DISCLOSURE

1. Field of the Disclosure

The disclosure relates generally to optical devices and, more particularly, to optical devices configured for single-mode transmissions.

2. Brief Description of Related Technology

Optical networks often utilize single-mode fiber rather than multimode fiber. Optical signals traveling in single-mode fiber generally experience less dispersion and, as a result, single-mode fibers can carry more information over longer distances. Further performance advantages arise from the many ways in which single-mode transmission of light may be manipulated, most of which are not possible (or highly impracticable) with multimode light. For example, single-mode signals are easily amplified without requiring a conversion to electrical signals. Filtering and switching can also be performed according to wavelength and phase. In contrast, signal control inside multimode fiber is very complex, with typical multimode optical fiber often having over 100 modes available for the light energy to occupy. The modes active at any moment are thus largely beyond control.

Notwithstanding the high data transfer rates and other benefits of single-mode transmission, the use of single-mode fiber presents a number of challenges, particularly at connection points involving one or more fibers. For example, FIG. 1 shows a common butt-joint connection in which two single-mode fibers 20, 22 are abutted in a non-permanent connection (i.e., a connection configured to support one or more coupling or de-coupling steps). To facilitate the alignment and abutment of the mating fibers 20, 22, the connection typically involves the physical arrangement of a plug 24 and corresponding receptacle 26. The challenge is to align the fibers sufficiently to achieve low-loss coupling. Unfortunately, sub-micron tolerances are often required. Moreover, an initial alignment may be difficult to maintain when the connection is submitted to vibrations or thermal changes.

Complicating matters further, dirt or other particle contamination present at or near the center of the connection can cause catastrophic failure, especially in high-power applications. The single-mode fibers 20, 22 typically have a very small core 28 of about four to eight microns in diameter, which can easily be permanently scratched by dirt or other particles during coupling and decoupling operations. Even if catastrophic failure is avoided, dirt can permanently degrade the optical performance of a standard single-mode fiber connection. For these reasons, the standard single-mode connection shown in FIG. 1 is typically not suitable for use in a number of environments, e.g., where dirt is present.

In the event of a scratch, a single-mode connection usually needs to be replaced. Connection replacement is often performed in the field, typically by a highly trained technician. In such cases, physical access to the connectors and abutting fibers can be problematic. For these reasons, single-mode connectors are typically not used when the connector cannot be easily accessed, such as inside a liquid tank.

Even when dirt is absent, standard single-mode fiber connections are often unsuitable for high-power applications. The small output cross-section of the core 28 is susceptible to surface damage if the optical signal intensity exceeds a relatively low value.

These alignment and other challenges presented by the traditional butt-joint connections have been addressed in the past via the insertion of an intermediary optical element. Some intermediary optical elements have been physically separated from the fiber, while others have been integrated within the fiber. In either case, the optical cross-section of the connection is often expanded to maximize the transmission through the connection. The wider cross-section relaxes the transverse alignment accuracy requirements and also reduces the susceptibility to contamination during subsequent coupling and decoupling steps. The connectors used in this type of connection are often referred to as expanded beam single-mode connectors, or single-mode tapered connectors. See, for example, Carlsen U.S. Pat. No. 4,421,383, entitled "Optical Fiber Connectors." In a typical expanded beam single-mode connector, the mode size is expanded from its nominal single-mode value to a larger size (e.g., a larger diameter). In the corresponding, or mating, connector (i.e., the second half of the connection), the beam diameter is reduced in size as it propagates down a corresponding taper toward the output fiber.

Unfortunately, tapered connectors, such as modified fibers, lenses (or micro-collimators), and integrated, tapered waveguides, have generally been hampered with shortcomings. For example, fibers have been tapered using fusion, up-tapering of a fiber preform, and dopant diffusion via heat treatment. Unfortunately, none of these techniques, has been shown to generate sufficiently large cross sections. See, for example, the following papers: Furuya, et al., "Low loss splicing of single-mode fibers by tapered-butt-joint method," Trans. IECE Jpn., vol. E61, p. 957 (1978); Amitay, "Optical fiber tapers—A novel approach to self-aligned beam expansion and single-mode hardware," J. Lightwave Technol., vol. LT-5, p. 70 (1987); Shigihara, et al., "Modal field transforming fiber between dissimilar waveguides," J. Appl. Phys., vol. 60, p. 4293 (1986); Ohtera, et al., "Numerical analysis of eigenmodes and splice losses of thermally diffused expanded core fibers," J. Lightwave Technol., vol. 17, pp. 2675-2682 (1999). In these and other cases, the tapering ratio (i.e., the output diameter relative to the input diameter) has been limited to undesirably small values.

In connectors having a lens or micro-collimator, the light beam emitted from a fiber end is expanded and collimated by a lens (e.g., a GRIN lens) and directed at the other half of the connection via free-space propagation. A corresponding connector element of the second-half of the connection then receives the collimated, larger diameter beam after free-space propagation, and focuses it onto the end of another fiber. Because the beam is of relatively large diameter when it is transferred from one connector element to the other connector element, the lateral alignment accuracy requirement is reduced. Examples include the STRATOS Lightwave™ connectors commercially available from Glenair, Inc. (www.glenair.com, Glendale, Calif.) and those described in Ukrainczyk U.S. Pat. No. 6,632,025, entitled "High power expanded beam connector and methods for using and making the high power expanded beam connector."

Many commercial single-mode expanded beam connectors are based on the free-space lens design. Unfortunately, these expanded beam connectors are often very sensitive to vibration and dust, making them unsuitable for operation in demanding environments. Moreover, the lenses are often undesirably bulky, and generally incompatible with high-density fiber connectivity. Still further, reductions in lateral alignment requirements may come at the price of increased angular alignment sensitivity.

Integrated tapered waveguides are often used to convert optical mode sizes to couple optical devices of different cross-sectional dimensions. Despite common use in optical mode size conversions, integrated tapered waveguides generally present efficiency problems. To achieve an efficient power transfer, the guided mode should evolve through the integrated taper in adiabatic fashion. In other words, the taper is designed in theory to let the optical signal propagate under radiation-loss-free and mode-conversion-free conditions. Integrated and other waveguides have been difficult to taper for adiabatic transmission through the connection.

A number of methods of increasing the coupling efficiency of tapered waveguides are described in the literature. The methods are broadly classified into three categories, cross-sectional dimension tapering, index tapering, or a combination of both, as discussed in the following papers:
(i) Mitomi, et al., "Design of a single-mode tapered waveguide for low-loss chip-to-fiber coupling," IEEE J. Quantum Electron., vol. 30, pp. 1787-1793 (1994);
(ii) Suchoski, Jr., et al., "Constant-width variable index transition for efficient Ti—LiNbO3 waveguide-fiber coupling," J. Lightwave Technol., vol. 5, pp. 1246-1251 (1987);
(iii) Yanagawa, et al., "Index-and dimensional taper and its application to photonic devices," J. Lightwave Technol., vol. 10, pp. 587-591 (1992); and,
(iv) Yamaguchi, et al., "Low-loss spot-size transformer by dual tapered waveguides (DTW-SST)," J. Lightwave Technol., vol. 8, pp. 587-593 (1990).

Theoretically, completely adiabatic tapered waveguides are realized by simultaneously altering the refractive index and the cross-section of the waveguide. However, this result is very difficult to achieve with the lithographic tools that are commonly used when manufacturing the planar circuitry of integrated devices. Lithographic and other fabrication tools are generally suited for tapering in a single plane. The production of such integrated devices is also typically undesirably complicated via the use of multiple materials, substrates or other components arranged in complex structures.

SUMMARY OF THE DISCLOSURE

In accordance with one aspect of the disclosure, an optical connector is useful in connection with propagation of a single-mode signal carried by a waveguide. The optical connector includes an optical medium having a first face for permanent attachment to the waveguide, a second face for a non-permanent connection, and a region between the first and second faces. The optical connector further includes a non-fiber, connector waveguide disposed in the region to propagate the single-mode signal from the first face to the second face. The connector waveguide is optically matched to the waveguide at the first face to receive the single-mode signal carried by the waveguide. The connector waveguide includes a taper section such that the connector waveguide is enlarged at the second face to support an expanded beam of the single-mode signal for propagation through the non-permanent connection.

In some cases, the taper section includes a plurality of waveguide segments that carry the single-mode signal collectively as an ensemble. The cross-section of the ensemble is enlarged through the taper section to support the expanded beam. A transverse spacing between adjacent waveguide segments in the plurality of waveguide segments may be increased to enlarge the cross-section of the ensemble. Alternatively or additionally, the plurality of waveguide segments are disposed such that a varying number of constituent segments carry the single-mode signal as the cross-section of the ensemble is enlarged.

In some embodiments, the connector waveguide includes a plurality of discrete longitudinal segments of modified refractive index, the plurality of discrete longitudinal segments being configured to carry the single-mode signal collectively as an ensemble. Respective segments of the plurality of discrete longitudinal segments may only run a portion of a length of the taper section. The taper section may then have a transverse waveguide segment density that decreases along the length of the taper section to enlarge the connector waveguide and support the expanded beam.

In some cases, the connector waveguide may include an output section between the taper section and the second face and further include a lens-like structure between the taper section and the output section for aiding in the transition of the expanded beam into the output section or collimation into free-space beyond the second face. The lens-like structure includes a further plurality of discrete longitudinal segments of modified refractive index that effects a waveguide segment density higher than that of respective portions of the taper section and the output section adjacent to the lens-like structure. Alternatively or additionally, the connector waveguide may include an input section between the first face and the taper section and further include a lens-like structure between the input section and the taper section as a transition to the taper section. In such cases, the lens-like structure includes a further plurality of discrete longitudinal segments of modified refractive index that effects a waveguide segment density lower than that of respective portions of the input section and the taper section adjacent to the lens-like structure.

The connector waveguide may further include an output section following the taper section that, in turn, includes a birefringence-inducing stressor to preserve polarization of the single-mode signal. Alternatively or additionally, the output section may have a cross-sectional shape to preserve polarization of the single-mode signal.

In some cases, the second face includes a flat surface disposed around an end of the connector waveguide to promote angular alignment for the non-permanent connection. The flat surface may accommodate a two-dimensional connector waveguide array disposed in the optical medium such that the connector waveguide array comprises the connector waveguide. Alternatively or additionally, the second face includes either a projection or a depression from the flat surface to promote alignment for the non-permanent connection.

The region of the optical medium may include a monolithic bulk region in which the connector waveguide is disposed. The monolithic bulk region may have multiple waveguides disposed therein.

In accordance with another aspect of the disclosure, an optical device is useful for propagation of a single-mode signal. The optical device includes an optical medium having a first face, a second face, and a region between the first and second faces. The optical device further includes a waveguide disposed in the region to propagate the single-mode signal from the first face to the second face. The waveguide includes an input section disposed at the first face to receive the single-mode signal, a taper section that receives the single-mode signal from the input section to generate an expanded or narrowed beam of the single-mode signal via discrete modulation of waveguide cross-section, and an output section to support the propagation of the expanded or narrowed beam of the single-mode signal.

In some cases, the taper section includes a plurality of waveguide segments. A transverse spacing between adjacent waveguide segments of the plurality of waveguide segments may be modulated to provide the discrete modulation of the waveguide cross-section. The plurality of waveguide segments may be disposed such that a varying number of constituent segments of the plurality of waveguide segments carry the single-mode signal as the waveguide cross-section is modulated.

In some embodiments, the connector waveguide includes a plurality of discrete longitudinal segments of modified refractive index. Respective segments of the plurality of discrete longitudinal segments may only run a portion of a length of the taper section. Alternatively or additionally, the taper section may have a transverse waveguide segment density that decreases along the length of the taper section to enlarge the connector waveguide and support adiabatic propagation of the beam.

In accordance with yet another aspect of the disclosure, a method is useful for fabricating a mode enlarger for a single-mode signal propagating in a longitudinal direction while undergoing mode expansion transversely relative to the longitudinal direction. The method includes or involves the steps of (i) writing a plurality of segments of modified refractive index using an ultrashort laser beam, each of the plurality of segments being arranged in the longitudinal direction in an optical medium, and (ii) adjusting transverse spacing between adjacent segments of the plurality of segments to effect the mode expansion as the single-mode signal propagates in the longitudinal direction.

In some cases, the adjusting step includes the steps of terminating a first set of segments of the plurality of segments having a first transverse segment density, and directing the ultrashort laser to write a second set of segments of the plurality of segments having a second transverse segment density lower than the first transverse segment density. Alternatively or additionally, the transverse spacing is adjusted in discrete steps. The transverse spacing may be reflective of a distance between respective longitudinal center lines of the adjacent segments.

In some embodiments, the writing step includes the step of establishing a spot size for the ultrashort laser beam such that the adjacent segments overlap to form an ensemble for carrying the single-mode signal. The method may then further include the step of adjusting the spot size of the ultrashort laser beam as the transverse spacing is adjusted such that an extent to which the adjacent segments overlap is modified.

In some cases, the method further includes the step of adjusting a writing speed for the writing step to control the modified refractive index.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 1:
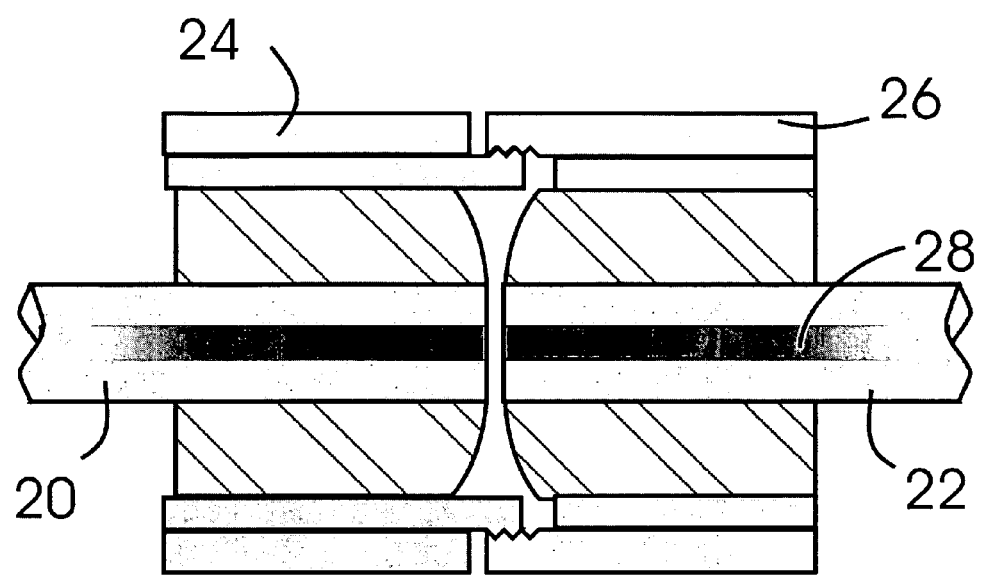
FIG. 1 is a schematic representation of a prior art connection involving abutting fibers.

While the disclosed devices and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

The following description generally relates to optical devices, as well as methods of fabricating such devices. As described below, the disclosed devices and fabrication methods are well suited for use in single-mode transmission contexts, such as in connections through which single-mode transmission should be maintained. However, the disclosed devices and methods are not limited to such contexts, but rather may be useful in a variety of optical device contexts in which, for instance, one or more single-mode signals are processed, transmitted or guided.

In accordance with certain aspects of the disclosure, the optical devices described herein generally support the propagation of one or more single-mode signals in circumstances, such as beam expansion, that may otherwise result in detrimental mode conversion or unacceptably high losses. To this end, the devices and methods described herein are configured for adiabatic beam tapering, expansion, enlargement or other size modifications. For ease in description, the term "taper" and any of its derivatives (i.e., tapering, etc.) are used herein to refer to such beam size modification, whether in the expanding or narrowing sense. As described below, the disclosed devices and methods may be applied to address a number of different optical challenges and circumstances, regardless of whether the beam is being expanded or narrowed, and regardless of other characteristics of the single-mode signal, such as polarization. However, in some cases, the expanded beams carried by the optical devices described herein may advantageously address the aforementioned axial alignment, particle contamination, signal intensity and other problems encountered when dealing with single-mode transmissions.

The embodiments described herein take advantage of direct-write techniques utilizing ultrashort pulsed lasers. The writing generally involves refractive index modification in a region within the bulk of an optical medium targeted by the focused beam. Relative movement of the optical medium or the focal spot is then used to modify the refractive index elsewhere within the bulk, thereby forming, or writing, an optical structure. Ultrashort laser pulses are herein defined to include laser pulses below 1 picosecond in duration, and may further include sub-100 femtosecond laser pulses. Lasers suitable for generating ultrashort pulses are generally available from a number of companies and other sources, including Coherent, Inc. (Santa Clara, Calif.) under the trade name "RegA" and Spectra Physics (Mountain View, Calif.) under the trade name "Tsunami." Such ultrashort pulsed lasers can typically achieve pulse widths of less than 100 femtoseconds. Direct-writing within an optical material may be achieved with pulse energies on the order of nano-Joules to several micro-Joules depending on the pulse widths as well as focusing optics. The lasers utilized in direct-write techniques are variously referred to as femtosecond or ultrafast lasers in reference to the length or frequency of the pulses generated.

Further details regarding the use of ultrashort laser pulses to modify the refractive index and, in so doing, direct-write waveguides and waveguide segments may be found in U.S. Pat. No. 6,768,850, entitled "Method of index trimming a waveguide and apparatus formed of the same" and copending and commonly assigned U.S. patent application Ser. No. 10/676,972, filed Sep. 30, 2003, and entitled "Waveguide Fabrication Methods and Devices," the disclosures of which are hereby incorporated by reference in their entirety as well as for specific reasons noted herein.

Fabrication of the disclosed devices is not limited to any particular laser equipment or laser configuration described herein or in the above-referenced documents. Notwithstanding the foregoing reference to certain pulse widths and energies, any laser configuration or combination of laser pulse characteristics, such as pulse width, energy, scan rate, repetition frequency, wavelength, and spot size, may be used when sufficient for the localized modification of the refractive index in an affected region within the bulk of the optical medium in which the device is formed.

As described below, some embodiments of the disclosed devices and methods are based on discrete tapering. Suitably adiabatic transmission of single-mode signals is supported despite the discrete (rather than gradual or smooth) steps taken during tapering. In this way, the disclosed devices may be used as connectors and in connections and other circumstances that maintain single-mode transmission while avoiding detrimental mode conversion or the unacceptable losses arising therefrom. Nonetheless, the methods and devices described herein may, in some cases, also be used in conjunction with other tapering techniques that, for instance, involve gradual or smooth changes in mode size (see, e.g., FIG. 8).

Figure 2:
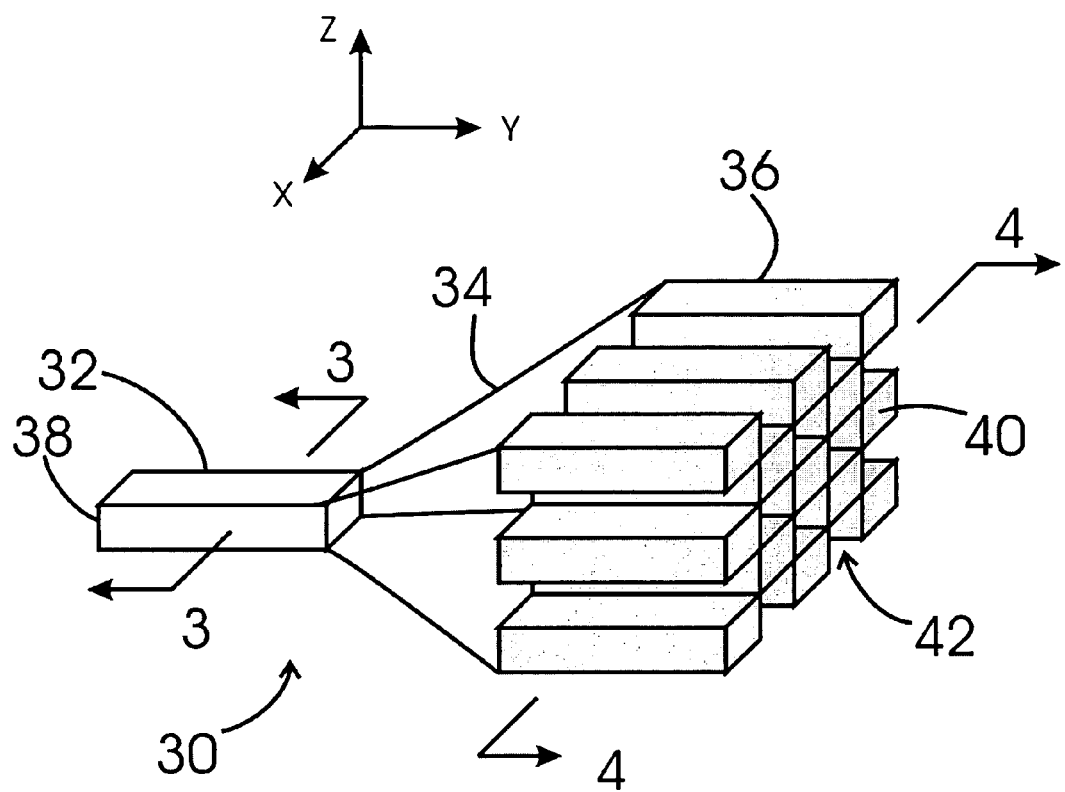
FIG. 2 is a schematic representation of a mode-enlarging device having a taper section to support propagation of a single-mode signal in accordance with one aspect of the disclosure.

Turning now to FIG. 2, a mode-enlarging device indicated generally at 30 and configured in accordance with one embodiment includes a non-fiber waveguide having an input waveguide section 32, a taper section 34, and an output waveguide section 36. The mode-enlarging device 30 may form part of a connector, as described below. More generally, the sections 32, 34 and 36 of the device 30 are disposed in an optical medium (see, e.g., FIG. 9) well suited for transmission of optical signals through waveguides formed therein via regions of modified refractive index. The sections 32, 34 and 36 may be written in the bulk of the optical medium as three-dimensional structures, the cross-sectional shapes of which may be configured for optimal transmission characteristics (e.g., mode selection, polarization, etc.).

The input waveguide section 32 is generally configured (e.g., sized and shaped) to be optically matched to a fiber or other source (see, e.g., FIG. 9) of an incoming optical signal. For example, the input section may have an end 38 disposed at one face of the optical medium that is fixedly or permanently attached to a fiber carrying a single-mode signal. The end 38 and, more generally, the input waveguide section 32 may therefore be written to have waveguide dimensions equal to or compatible with the fiber to receive the single-mode signal without detrimental losses or reflection. Proper sizing and shaping of the input waveguide section 32 may be accomplished by the painting techniques described in the above-referenced document entitled "Waveguide Fabrication Methods and Devices." For example, the input waveguide section 32 may be composed of a series of lines of modified refractive index, the lines being written by successive scans of the ultrashort laser beam. The beam may be directed to the optical medium either transversely to, or in line with, the waveguide propagation axis (i.e., transverse or longitudinal writing, respectively). Using either beam scanning methodology, the rectilinear waveguide shape shown in FIG. 2 may be formed despite the elliptical or other shape of the focal spot. As set forth in the above-referenced documents, the cross-section of the waveguide 32 may take on any desired shape via the trimming and painting techniques described therein. These techniques may also be applied throughout the fabrication process with other sections, structures, or other aspects of the disclosed device to achieve full three-dimensional shaping for any waveguide or waveguide segment, to reduce interface mismatch, etc.

Figure 5:
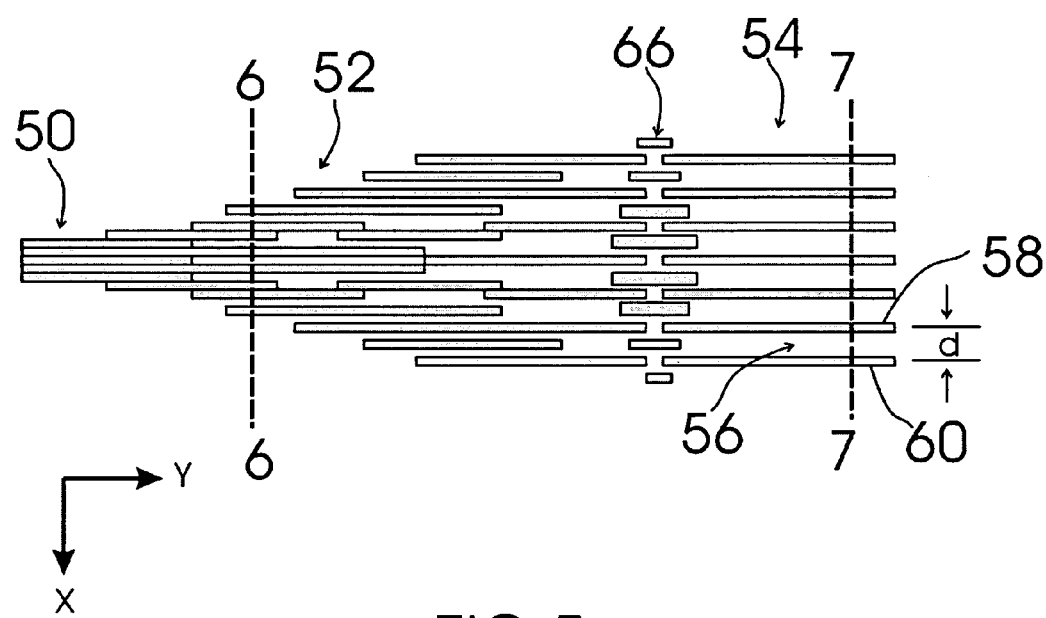
FIG. 5 is a sectional representation of a mode-enlarging device having a plurality of segments of modified refractive index in accordance with another aspect of the disclosure.

In accordance with some embodiments, the taper section 34 of the device 30 is also formed via a number of discrete scans in that region of the optical medium. As described below, these scans result in waveguide segments that collectively carry the single-mode signal as it is progressively expanded from the dimensions of the input waveguide section 30. A simplified, two-dimensional representation of this three-dimensional expansion is shown in FIG. 5. In operation, at each point along the way from the input waveguide section 32, the constituent waveguide segments of the taper section 34 act as an ensemble to carry the single-mode signal as a super-mode toward the output waveguide section 36.

The output waveguide section 36 is also formed from a number of discrete scans spread over the expanded region shown in FIG. 2. The output waveguide section 36 also includes an array of waveguide segments 40 that collectively carry the single-mode signal as a super-mode spread over the array. In some cases, each constituent waveguide segment 40, in turn, may be written via a set of scans in much the same manner as the input waveguide section 32 is written. That is, the rectilinear shape of each waveguide segment 40 may be formed via, e.g., three or four painting stripes. However, each waveguide segment 40 may alternatively be formed via single stripe (i.e., writing scan) in the interest of manufacturing efficiency. In either case, the resulting waveguide segments 40 form a lattice of modified refractive index capable of carrying the single-mode signal collectively. As described below, the lattice includes spacing indicated generally at 42 and introduced in between adjacent waveguide segments 40 to support the enlarged size of the single mode signal. In some cases, the spacing 42 may represent the distance between successive scans of the writing beam that form each waveguide segment 40, respectively.

The output waveguide section 36 need not have the exact arrangement shown in FIG. 2. The array of waveguide segments 40 need not be, for instance, a 3×3 array, and the size and shape of each spacing 42 between adjacent waveguide segments 40 is for convenience in illustration only. Thus, the pattern formed by the array of waveguide segments 40 need not involve spacings 42 that are similar in size and shape to the segments 40, even though the pattern may involve other beneficial symmetries or repetition. It follows that this aspect of the disclosed technique is not limited to any geometrical or dimensional configuration, and is instead generally directed to establishing an average or effective or composite modified refractive index over the waveguide cross-section of interest that has a value that selectively supports the mode of the single-mode signal.

Figure 3:
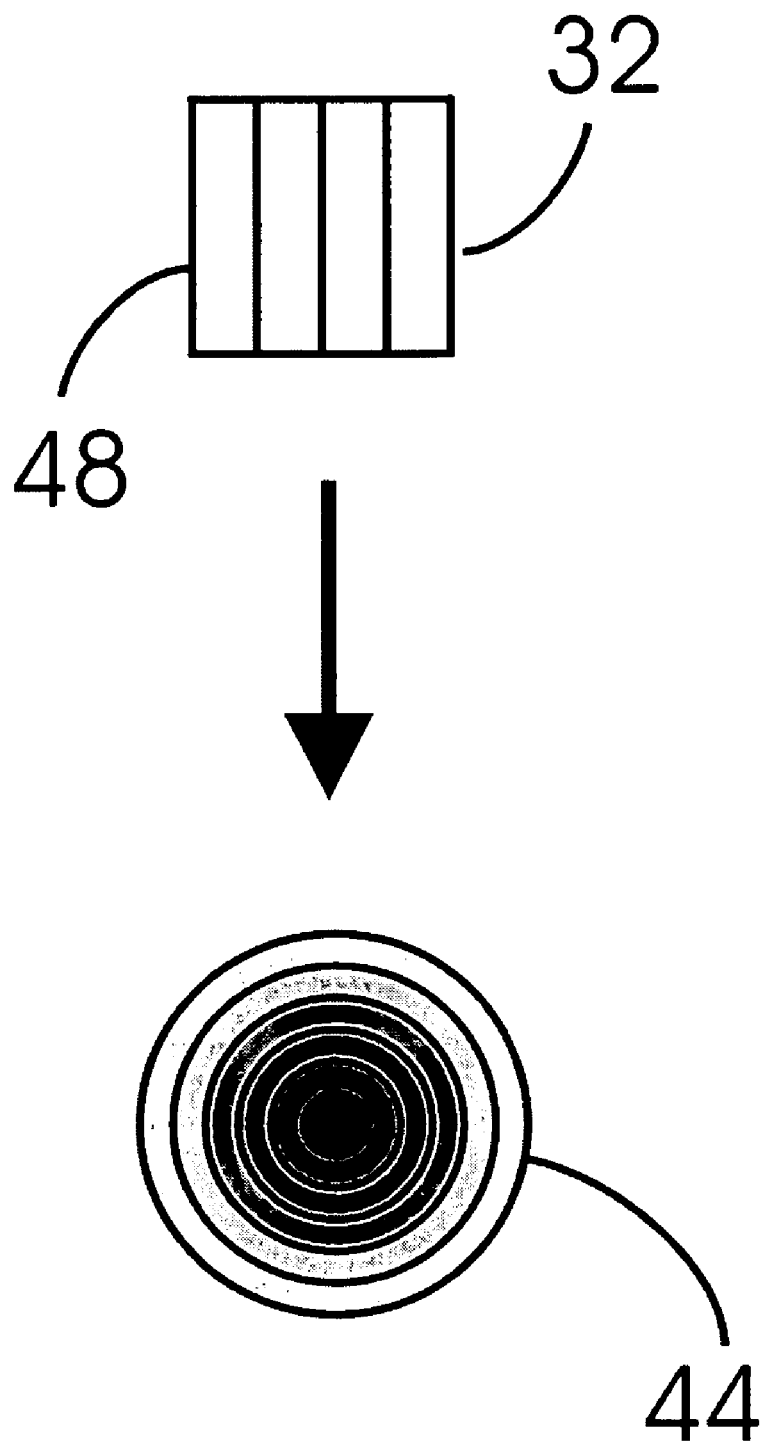
FIG. 3 show sectional and representational views of a waveguide and the corresponding mode distribution during propagation of the single-mode signal, respectively, and prior to mode expansion via the device of FIG. 2.
Figure 4:
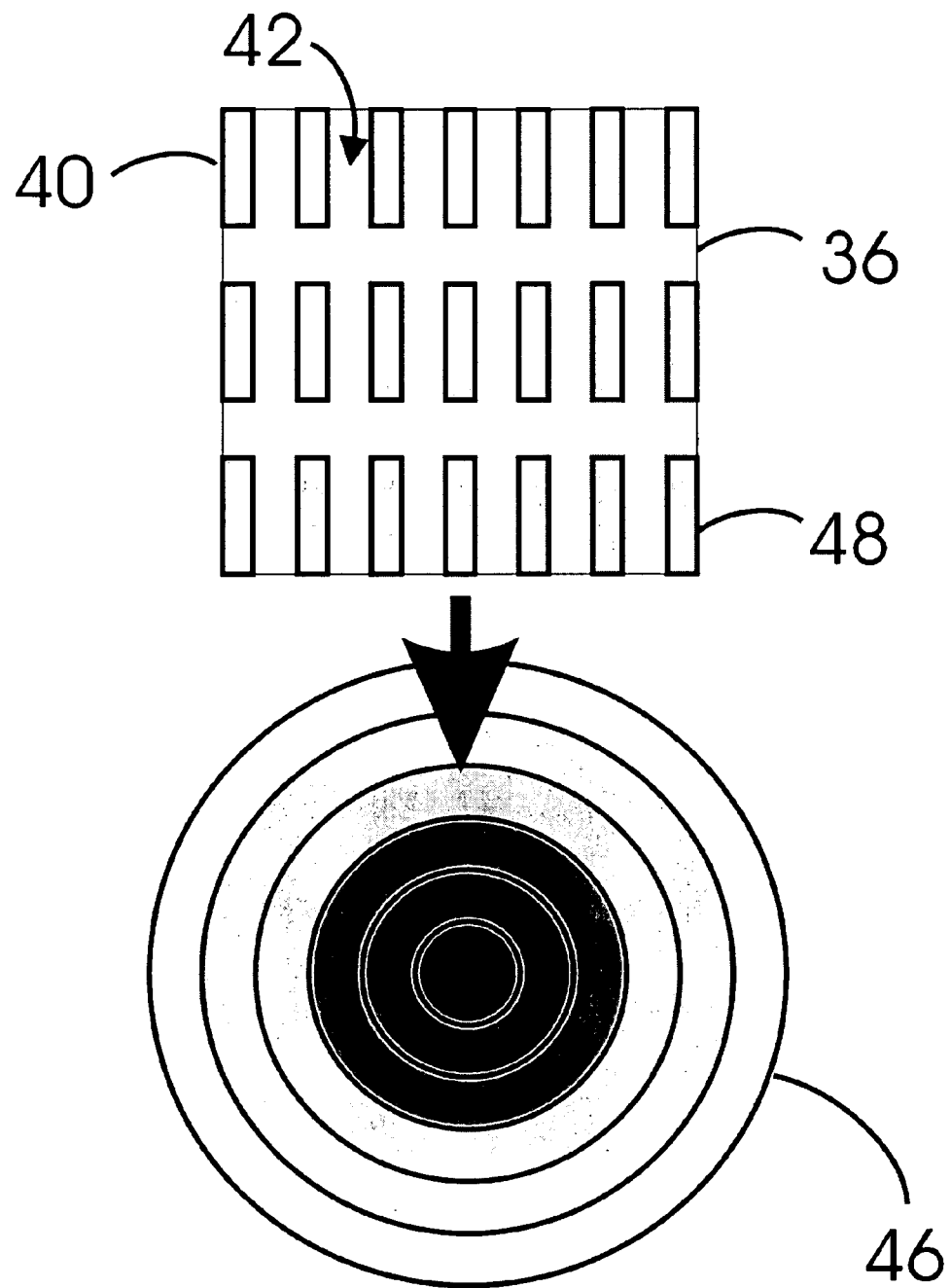
FIG. 4 show sectional and representational views of the enlarged mode section and corresponding mode distribution, respectively, after mode expansion via the device of FIG. 2.

FIGS. 3 and 4 depict the input and output waveguide sections 32 and 36, respectively, along with representations 44, 46 of the distribution of the single-mode signal carried thereby. In this embodiment, each writing scan for the output waveguide section 36 results in a respective waveguide segment 40.

In the embodiment shown in FIGS. 3 and 4, each writing scan results in an oblong or elliptical affected region 48 as shown. The shape and size of the input waveguide section 32 are established by writing a number of these regions 48 in close proximity to each other. Multiple scans allow the input waveguide section 32 to be suitably shaped for propagation of a single-mode signal, and the resulting distribution 44 is concentrated within the area shown. In contrast, the spacing 42 between adjacent scans for the output waveguide section 36 results in a lower waveguide segment density across the cross-section and, as a result, a lower average modified refractive index and the larger distribution 46.

The waveguide segments 40 and scanned regions depicted in FIGS. 3 and 4 are shown with the understanding that the modifications in refractive index may be more complex than the simplified depictions of the waveguide segments, with each segment having well defined borders. As shown and described in connection with FIGS. 6 and 7, the effects of the scans may not be as clearly definable as that shown in FIGS. 3 and 4, but rather more distributed. As a result, in most cases, the refractive index modifications resulting from adjacent scans (or scan sets associated with a specific waveguide segment) may overlap to some (e.g., slight) degree even when the scans are separated by the spacing 42. Such overlapping of the resulting refractive index modifications, while slight in many cases, may provide the support for allowing the segments 40 to work as an ensemble in concert, thereby supporting the propagation of the smooth-profiled super-mode (i.e. de-localized over the waveguide segments), rather than division of the incoming signal into separate (i.e., localized) propagation in several individual waveguide segments. Alternatively, in some cases, the resulting refractive index modifications are spaced sufficiently closely to act in collective fashion (i.e., an ensemble) but not so close as to physically overlap. Whether and to what extent the adjacent regions of modified refractive index overlap may be a configuration decision based on contextual details, such as the medium material, the signal wavelength, the waveguide cross-sectional dimension, etc. The degree of spacing may, in some cases, considered to be a function of the modified refractive index in the processed region. The spacing is then configured to arrive at (i) a desired cross-sectional dimension (e.g., diameter of 50 microns), (ii) an average modified refractive index for the waveguide at that cross-sectional position that supports the single mode, and (iii) sufficiently close segments for collective propagation of the single mode and to prevent localization of the optical energy along a given waveguide segment. In this way, the spacing may be conceptualized as spaced from each other based on a center-to-center distance between adjacent waveguide segments.

The manner in which the single-mode signal is expanded from the dimensions of the input waveguide section 32 to the enlarged dimensions of the output waveguide section 36 is addressed by the exemplary embodiment shown in FIG. 5. The representation depicted in FIG. 5 is depicted as a two-dimensional cross-section of a waveguide segment arrangement for ease in illustration, where the sectional may be taken along a plane extending the length of the device (i.e., a plane parallel to the xy-plane defined in FIG. 2). In practice, the device shown in FIG. 5 may include multiple, similar layers of waveguide segments via extrapolation to an arrangement similar to that shown in FIG. 2-4. The waveguide segments shown in FIG. 5 thus depict only one layer of the multi-layered arrangement of segments written within the bulk of the optical medium. More generally, multi-layered segment configurations having shapes and symmetries suitable for single-mode transmission are made possible by the in-bulk writing capability of the direct-write laser writing technology. However, for practical or manufacturing reasons, certain, alternative embodiments do not stack, or pile, segment arrangements like the one shown in FIG. 5 to create a three-dimensional taper. In such cases, the segment arrangements are written instead in a continuous fashion in a plurality of inclined and declined planes (see, e.g., FIG. 8). These inclined/declined segment arrangements would therefore disperse to increase vertical spacing between waveguide segments written in adjacent planes. In contrast, the waveguide segments of the output waveguide section 36 may include a parallel, stacked set of identical segment arrangements.

The exemplary embodiment of FIG. 5 includes an input waveguide section indicated generally at 50, a taper section indicated generally at 52, and an output waveguide section indicated generally at 54. Generally speaking, the taper section 52 enlarges the mode carried by the input waveguide section 52 via discrete modulation of the waveguide cross-section. In this embodiment, the waveguide cross-section is modulated by adding and dropping waveguide segments in the taper section 52. The exact waveguide segment arrangement shown in FIG. 5 represents only one of many possible arrangements, where one or all of the waveguide segments run any desired portion of the length of the taper section 52. As described below, the discrete addition and termination of waveguide segments results in beam expansion while the effective, or composite, refractive index modification is lowered. In this way, the device supports adiabatic transmission of the single-mode signal introduced via the input waveguide section 50.

The general manner in which adiabatic transmission is supported through the taper section 52 is based on adjusting (e.g., lowering) the average or composite or effective refractive index modification of the waveguide as its cross-section changes. In some embodiments, the adjustment of the refractive index modification is achieved via a combination of techniques. The modified refractive index may be adjusted via gradual reduction of power or de-focusing, via an adjusted writing (or scanning) speed, and via adjusting the waveguide segment density as the beam expands (as described above). At each point along the length of the taper section 52 (i.e., the propagation axis of the device), the average or effective or composite refractive index for the super-mode is thus determined by the density and nature of the waveguide segments at that point. The waveguide segment density is, in turn, driven by the number and distribution of the waveguide segments. As disclosed herein, the adding and dropping of waveguide segments along the length of the taper section 52 allows both the number and distribution of the waveguide segments to be adjusted. As shown in FIG. 5, these parameters are controlled by adjusting the transverse spacing between adjacent waveguide segments. For example, the taper section 52 has eight waveguide segments in the transverse cross-section defined by the lines 6-6, while further down the propagation axis of the device, the taper section 52 and the output waveguide section 54 have only seven waveguide segments distributed over a wider region. In some cases, as in the transition from the input waveguide section 50 to the taper section 52, the number of waveguide segments may temporarily change in a non-constant pattern over the cross section. While there may be a special case for the temporary change (e.g., a lens), a concurrent change in the distribution of the waveguide segments may result in a net or effective decrease in waveguide segment density, thereby supporting the adiabatic beam expansion.

It should be noted that, in some embodiments, the waveguide segment arrangement shown in FIG. 5 may be replicated to create a three-dimensional tapering section. In addition to having the waveguide segments dropped and added along the X-axis (as shown), waveguide segments may be dropped and added along the Z-axis as well.

Each waveguide segment may have similar characteristics in size, shape, and refractive index profile, thereby simplifying the fabrication process. In that case, the effective refractive index for the ensemble of waveguide segments is driven by the waveguide segment density, as described above and dependent on the spacing between scans associated with the waveguide segments. The spacing between scans (or sets of scans, as applicable), and the resulting waveguide segment spacing 56, may be defined as denoted in FIG. 5 (spacing "d") as a center-to-center distance between adjacent segments 58 and 60.

Figure 6:
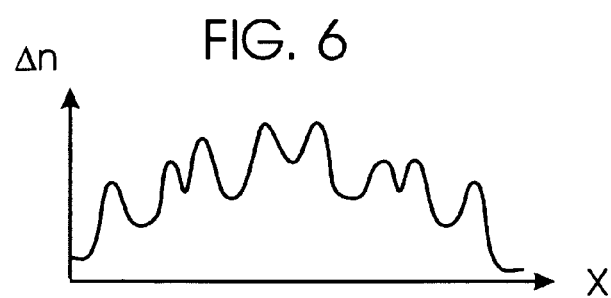
FIG. 6 is a graphical representation of an index profile of a taper section of the connector depicted in FIG. 5 and taken along the lines 6-6 of FIG. 5.
Figure 7:
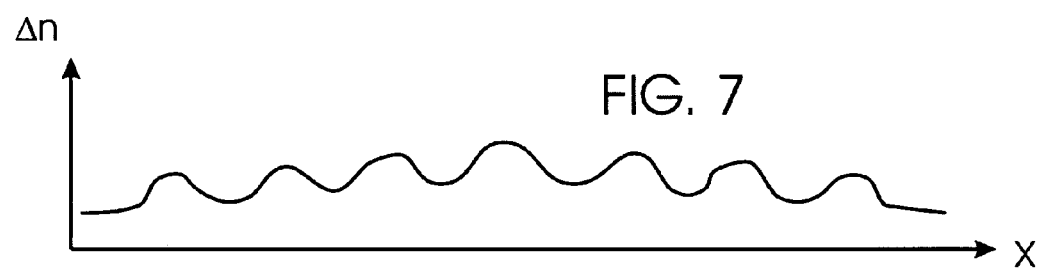
FIG. 7 is a graphical representation of an index profile of an enlarged mode section of the connector depicted in FIG. 5 and taken along the lines 7-7 of FIG. 5.

FIGS. 6 and 7 provide further details regarding the characteristics of each waveguide segment within the exemplary arrangement shown in FIG. 5. Specifically, FIGS. 6 and 7 plot the respective index profiles at two points along the propagation axis, Y, of the device (i.e., transverse cross-sections). The center of each respective waveguide segment generally corresponds with each peak of the distribution shown along the X-axis. As shown in the exemplary embodiment depicted by FIG. 6, the transverse spacing between waveguide segments need not be uniform.

The exemplary embodiment shown in FIGS. 6 and 7 show how the refractive index profile may be controlled not only via segment spacing, but also other parameters of the beam scanning technique. For instance, power level modulation may be used. In this example, higher power levels (or, equivalently, slower scanning rates) were used while the beam was writing the central waveguide segments (i.e., the segments corresponding with the two peaks in the center of the distribution) to provide greater index change in the inner portions of the taper section 52 relative to the outer portions, which may help avoid losses. Power level modulation may also be made when adding or dropping a waveguide segment to reduce or prevent any discontinuity in the adiabatic expansion of the optical mode.

Segment spacing also effectively adjusts the index change due to the extent to which the effects of each scan overlap with those of an adjacent scan. Less overlap means that the index change dips between the centers of each scan to a greater extent, thereby resulting in a lower composite refractive index for the super-mode. The ramifications of modulating segment spacing, and therefore scan effect overlap, can be made via comparison of FIGS. 6 and 7.

The spot size of the focused beam may also be adjusted on a segment-by-segment basis, within each segment, or otherwise as desired. De-focusing the beam may provide further control over the degree to which the scan effects overlap, as shown, for example, in the smoother Gaussian profiles of FIG. 7. The profiles created by the scan effects depicted in FIG. 6 may also be Gaussian, but may exhibit a saturation effect that caps the refractive index change. The flattened nature of the profiles depicted in FIG. 6 may also be due to painting techniques involving more than one scan for each waveguide segment.

As shown via the profiles of FIGS. 6 and 7, the writing beam may be adjusted by any one or more fabrication parameters during the scanning process to introduce variations within each waveguide segment, or between different waveguide segments, to further assist in supporting adiabatic transmission. For example, modifications in the characteristics (e.g., width) of certain portions of the waveguide ensemble (e.g., the outermost strip) may assist in embodiments where the desired fundamental mode is not characterized by a smooth profile such as the $TEM_{00}$ mode, but rather another fundamental mode characterized by a non-zero nodal pattern, such as the $TEM_{01}$ mode, which will pull the optical energy toward the edge(s) of the waveguide ensemble.

Figure 8:
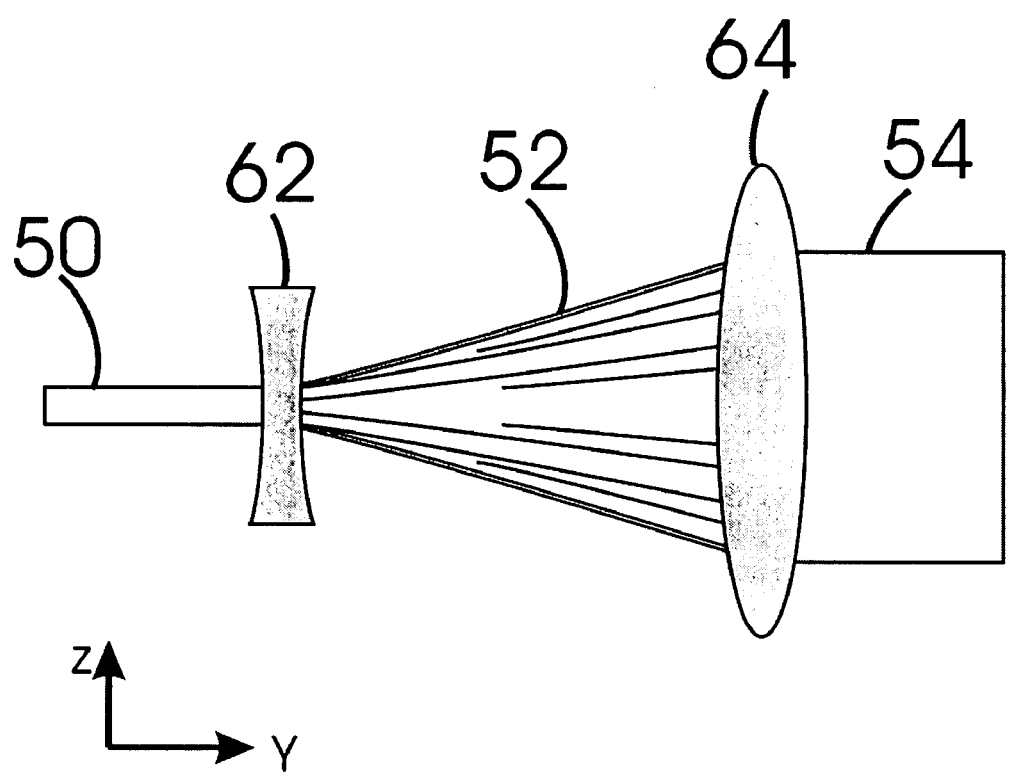
FIG. 8 is a schematic representation of a connector having diverging and converging lenses disposed at respective transition points within the connector in accordance with one embodiment.

Turning to FIG. 8, some embodiments may include one or more transition elements or regions that further assist in the support of adiabatic mode expansion of a single-mode signal between two straight (i.e., uniform size) waveguides. More specifically, a diverging or negative lens (or lens-like structure) 62 is disposed at the narrow end of the taper section 52, and a positive lens (or lens-like structure) 64 is disposed at the expanded end of the taper section 52. With these transition elements, excess losses are avoided that might otherwise result from the discontinuity arising from the change between sections. For instance, the diverging lens 62 helps the single-mode signal progress from a straight waveguide to one in which the beam is diverging. At the other end, the divergence occurring in the taper section 52 is acted upon by the positive lens 64 to ease out of the divergence.

In each case, each transition element may be formed via a pattern of waveguide segments that provide an optical equivalent to the respective lenses. For example, and as shown in FIG. 5, the segment arrangement may include an additional set of waveguide segments 66 that temporarily increase the waveguide segment density to increase the composite refractive index, thereby forming the lens 66.

FIG. 8 also shows an alternative embodiment in which discrete modulation of the effective waveguide cross-section is effected in different ways in different dimensions (i.e., along different axes). Different modulation schemes for different axes may simplify the fabrication process without any detrimental effects to the adiabatic transmission of the single-mode signal. In this exemplary case, the device is shown in a transverse cross-section taken along the Z-axis, where waveguide segments are not added and dropped in the exact same fashion as in each XY-plane (i.e., where each segment runs parallel to the propagation, or Y, axis, as shown in FIG. 5). Generally speaking, the discrete waveguide tapering in the Z-axis direction may take any desired form, but may still adjust the waveguide segment density via adding and dropping segments, albeit within a plane inclined or declined from the plane having the segment arrangement shown in FIG. 5. The waveguide segment spacing may also be adjusted by writing either all or part of the segment arrangement shown in FIG. 5, depending on the position along the Y-axis.

Figure 9:
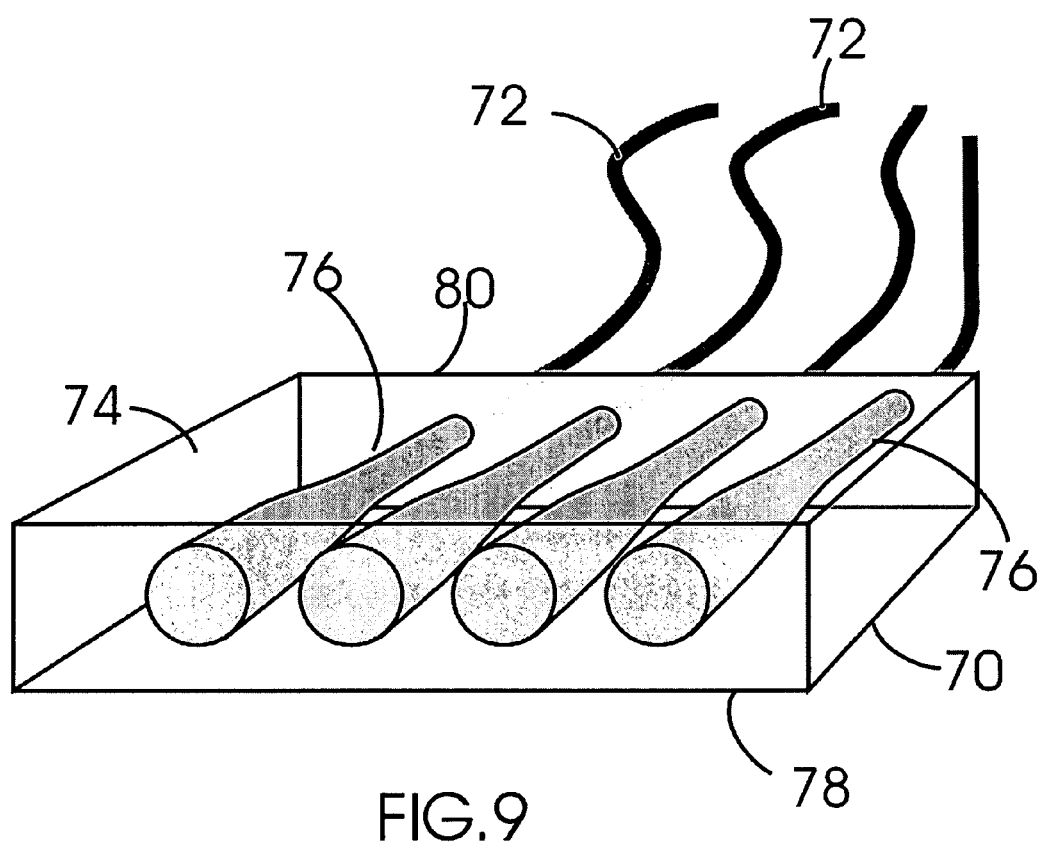
FIG. 9 is a representation of a connector array constructed in accordance with another aspect of the disclosure to support transmission of respective single-mode signals carried by a plurality of waveguides.

With reference now to FIG. 9, the techniques described above are applied in the context of a connector 70 designed to handle a connection involving one or several single-mode fiber-optic transmission lines 72 ("fibers"). The connector 70 forms one-half of a butt-joint connection in which the waveguides in the connectors are aligned with corresponding waveguides in a matching (or mating) connector to form a repeatably separable interconnect. A repeatably separable interconnect is to be contrasted from attachment and detachment operations, in which fixed or permanent bonds are formed and then broken between two fibers or other components.

The connector 70 includes an optical medium 74, which may be a monolithic or uniform substrate suitable for the direct-write fabrication techniques described and referenced above. The connector 70 may also include mechanical pieces (e.g., a metal shell) and other optical components integrated at interfaces (e.g., lenses) not directly germane to the mode-expansion and adiabatic transmission aspects of the connector 70.

The connector 70 may include any number of connector waveguides 76 written within the bulk of the optical medium 74. Each connector waveguide 76 may have input, taper and output sections similar to the devices described above, such that the optical output beam is larger at an output face 78 of the connector 70 than at an input face 80 where the standard single-mode fiber(s) 72 are attached. The dimensions of the connector waveguide 76 at the input face are generally sized to be optically matched with the dimensions presented by the single-mode fiber 72. The input face 80 and the attachment interface with the single-mode optical fiber(s) are better shown in FIG. 10, where a matching connector is shown opposite the connector 70.

Figure 10:
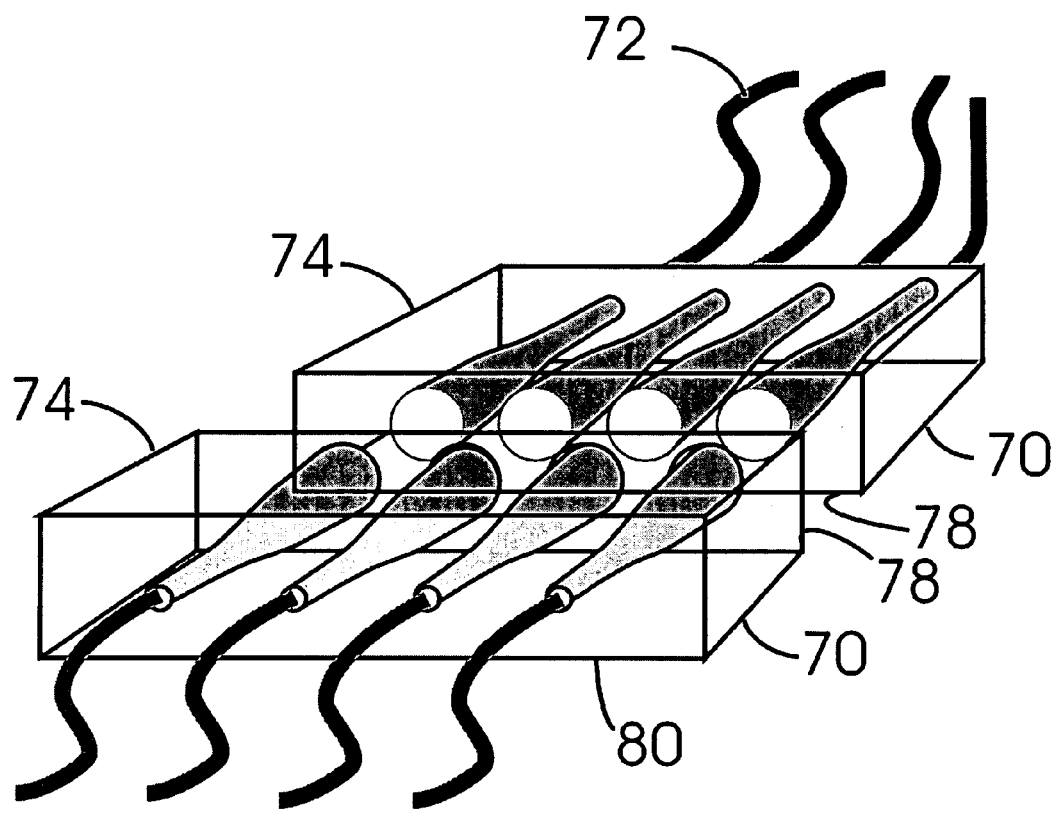
FIG. 10 depicts the connector array of FIG. 9 with a matching connector array to form a connection through which transmission of the single-mode signals is supported in accordance with one embodiment.

While the optical medium 74 may have any shape, in some embodiments it may useful for the face 78 to be flat, so as to promote angular alignment in the connection. That is, if the two matching connectors 70 are brought together as shown in FIG. 10 such that the output faces 78 meet, alignment may be improved if the faces are flat. Such angular alignment concerns may be exacerbated by the expanded beam via reducing the effective refractive index, in the sense that angular sensitivity generally increases with reduced numerical aperture. A large (i.e., oversized relative to the mode size), flat surface may therefore be desirable in some embodiments.

The term "face" should be understood to be used herein in a broad sense to neither be limited to an outermost side or portion of the medium 74, nor be construed as an entire side thereof. Instead, the medium 74 may have a face that corresponds with any portion of the medium that acts as an interface with a component disposed therein. In that sense, a face may, but need not, be flat, and further may include or incorporate elements other than the medium 74 itself.

Figure 11:
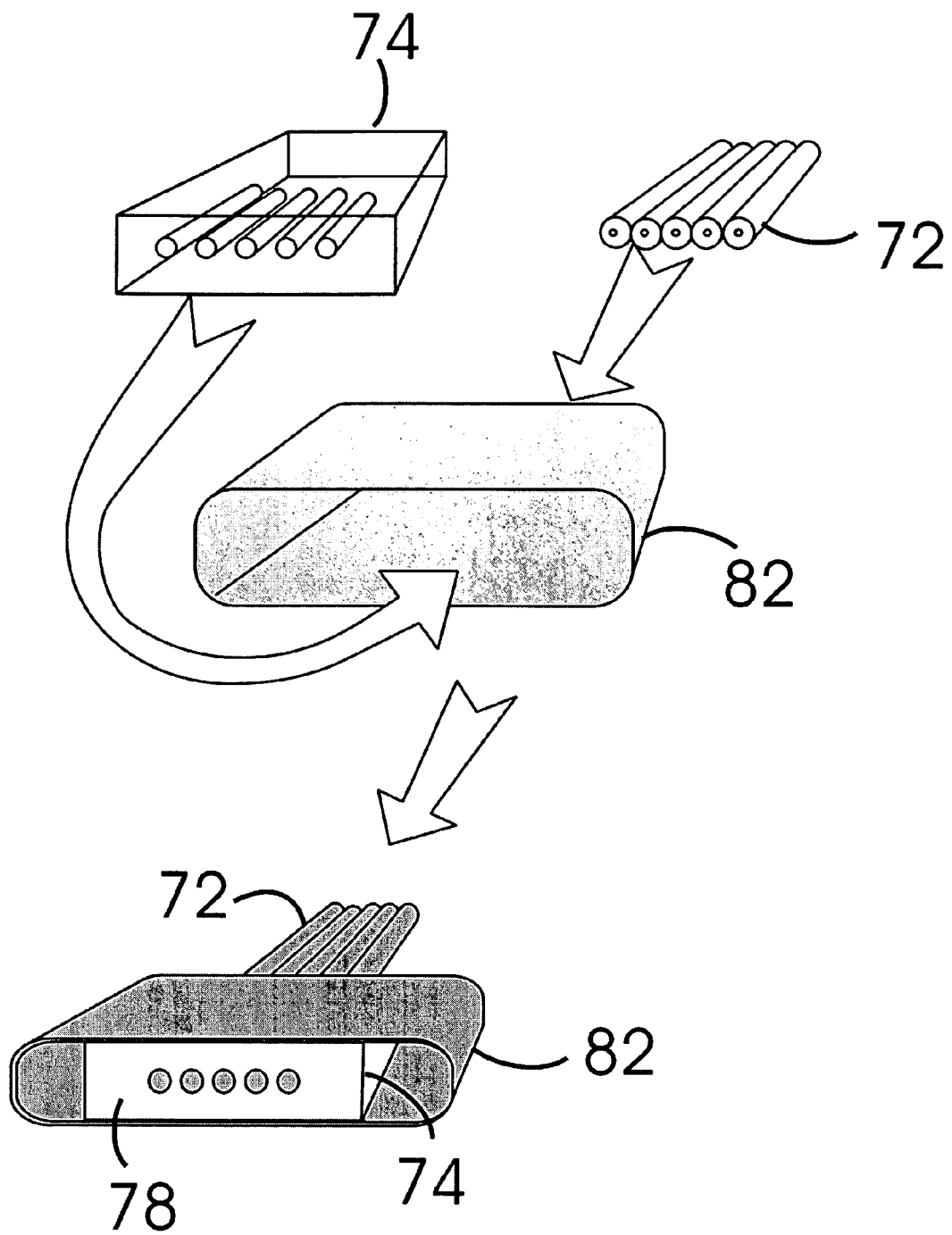
FIG. 11 is an exploded view of a connector array device incorporating the connector array of FIG. 9 within a housing.

FIG. 11 shows an optical connector in accordance with one embodiment as integrated with a metal shell 82. Insertion of the optical medium having the connector waveguides into the metal shell may generally form a socket or plug connector configured for repeatable engagement with a matching fitting or plug. More generally, the disclosed devices and methods are not limited to any particular physical structure responsible for mechanical alignment, but rather compatible with a variety of mechanical components due to robust nature of the optical medium and the disposition of the connector waveguides within the bulk thereof.

Figure 12:
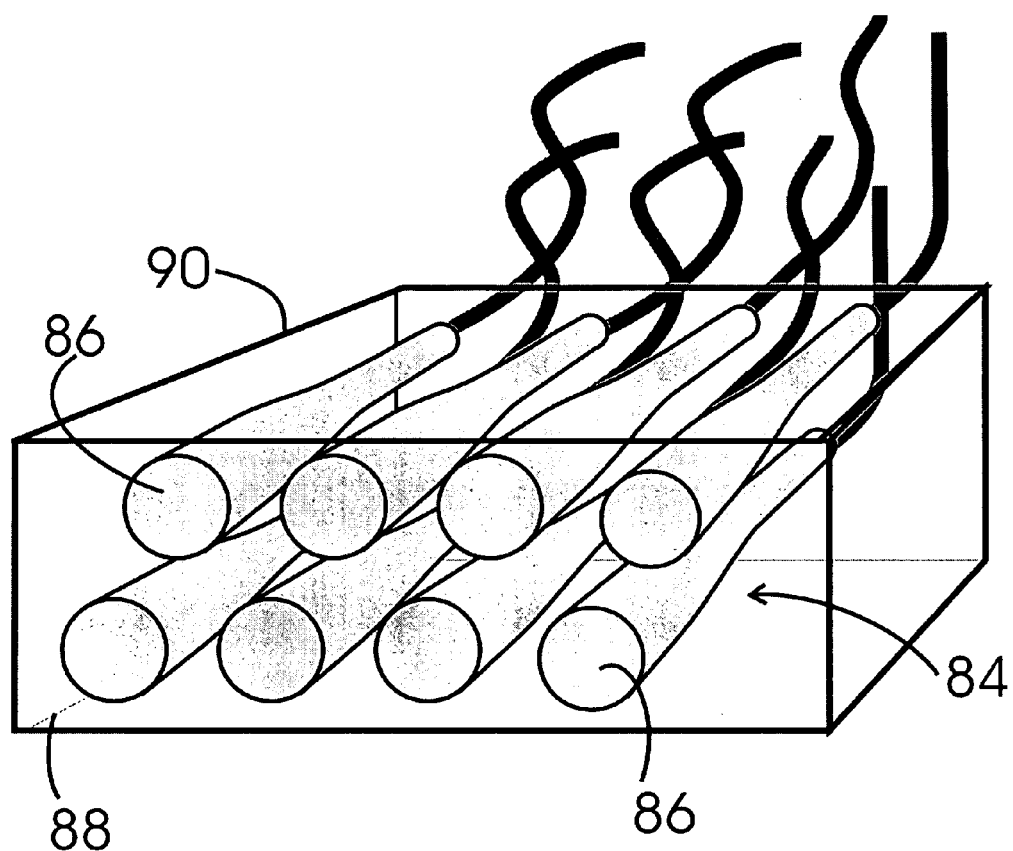
FIG. 12 is a representation of a two-dimensional connector array constructed in accordance with another embodiment.

FIG. 12 shows another embodiment having an array of optical connector waveguides indicated generally at 84 that present a two-dimensional set of interface points 86 on an output face 88 of an optical medium 90. The direct-write techniques described and referenced above permit the connector waveguides 84 to be written at any depth within the bulk of the optical medium 90. As a result, the connector efficiently utilizes the two-dimensional space provided at the connection interface 88. In addition to increased potential connection density, the increased size of the front face 88 of the connector may further assist in avoiding angular alignment problems, insofar as it may be oversized in two dimensions rather than just one.

Figure 13:
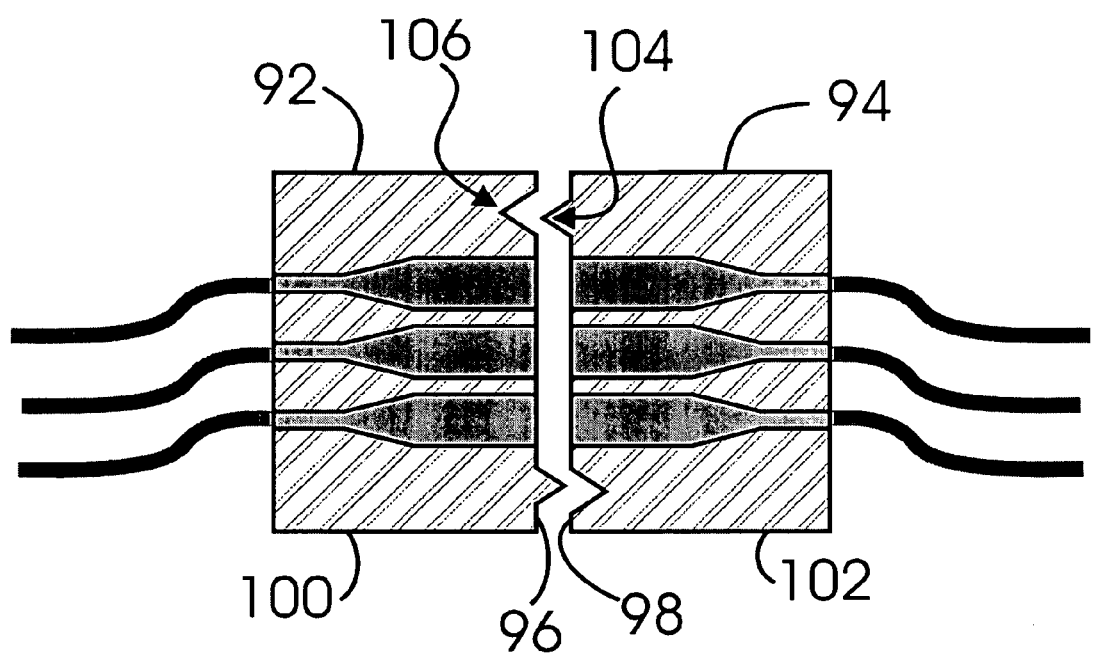
FIG. 13 is a schematic representation of a pair of matching connectors configured for connection with a key and corresponding lock in accordance with yet another embodiment.

FIG. 13 shows yet another embodiment in which matching or mating connectors 92, 94 have respective front faces 96, 98 with mechanical features configured to promote alignment. The substrate materials suitable for direct-writing the connector waveguides (e.g., fused silica) are compatible with the formation of a variety of different features fabricated in a variety of techniques. In this exemplary case, two blocks of fused silica 100,102 may be cut or otherwise machined to have a projection 104 and a groove 106 that form a matching key and lock combination.

Figure 14:
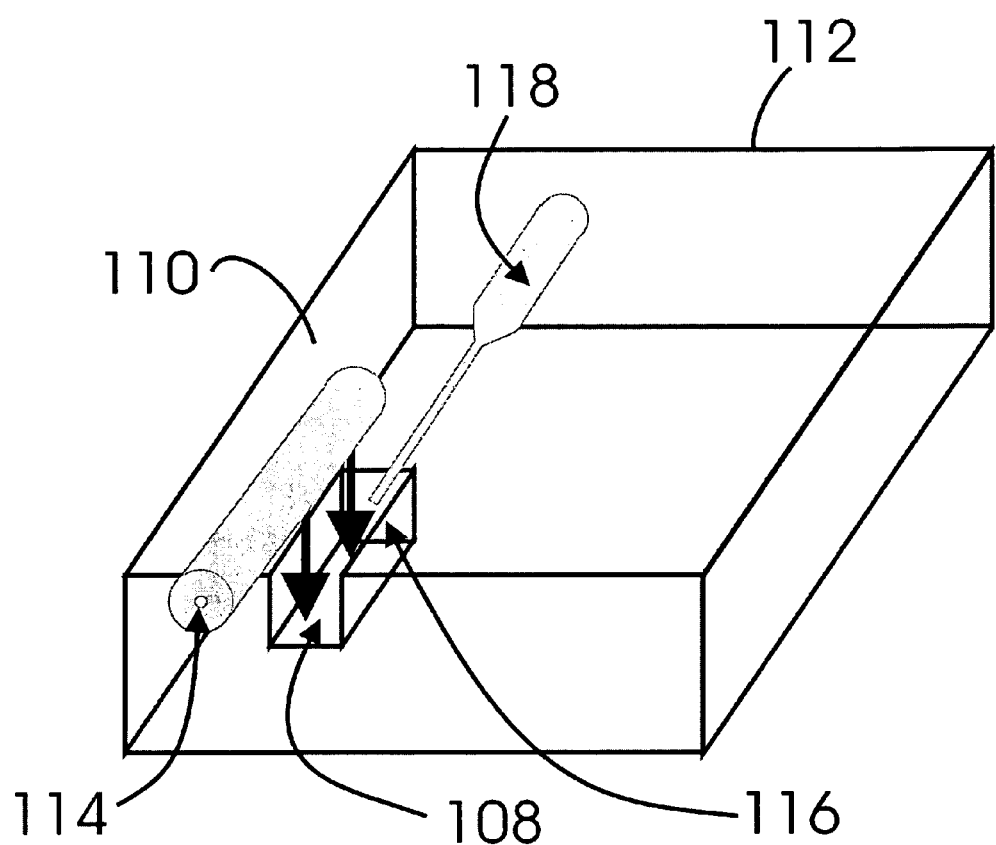
FIG. 14 is an exploded view of a connector device having groove or trough portion as an attachment interface for a waveguide carrying the single-mode signal to be transmitted through the connection.

FIG. 14 shows another way in which the use of fused silica, glass or other suitable materials for the optical medium are compatible with machining and other processing to promote alignment and attachment for a fiber connector. In this example, a U-shaped or V-shaped groove 108 is formed in a face 110 of an optical medium 112 in which an optical fiber 114 may be disposed. An interior face 116 of the groove 108 may be polished to present an optical quality surface for the interface between the fiber 114 and the optical medium 112 in which one or more connector waveguides 118 are written. Generally speaking, the groove 108 may assist in aligning the core of the fiber 114 with the connector waveguide formed within the medium 112 as described above. Once aligned, the fiber 114 may then be permanently attached using, for instance, epoxy. Alternatively, the fiber 114 may be fixedly secured within the groove 108 via brazing, welding, and the like. Other embodiments may utilize an interface component attached to the optical medium 112, such as a semiconductor (e.g., silicon)-based interface micromachined to accept one or more fibers. In still further alternative embodiments, an attachment hole (not shown) formed in the face of the optical medium may be used instead of the groove 108.

Figure 15:
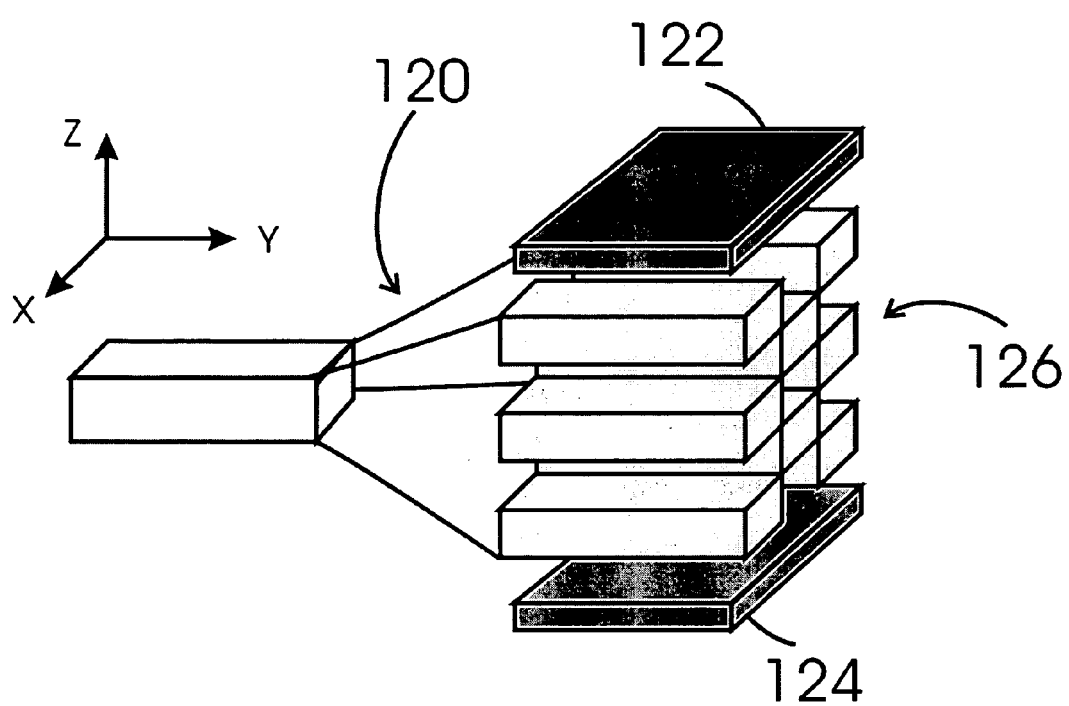
FIG. 15 is a schematic representation of a mode enlarger or connector device having one or more mechanisms for polarization preservation in accordance with a number of alternative embodiments.

With reference now to FIG. 15, an alternative mode enlarger or connector device 120 includes one or more mechanisms for polarization preservation. In cases where the incoming single-mode signal is polarized, the device 120 may be structured to maintain that polarization despite the mode expansion. In the exemplary embodiment shown in FIG. 15, a pair of additional regions of modified refractive index 122 and 124 may be written in a region proximate to one or more sections of the device 120. For instance, the regions 122 and 124 may be disposed on opposite sides of an output waveguide section 126 to favor polarization in a certain direction. To this end, the regions 122 and 124 act as birefringence-inducing stressors to the single-mode signal traveling through the output waveguide section 126. Similar stressors may be written near the other sections of the device 120, such as the input and taper sections.

FIG. 15 also shows an alternative (or additional) mechanism for polarization preservation. This mechanism relies on the structure and composite shape of the section(s) of the device 120. More specifically, the output section 126 may have a shape that favors or maintains the desired polarization. In contrast to the 3×3 (or 5×5, depending on whether more than one segment row is counted) segment arrangement shown in FIG. 2, the cross-section of the output section 126 is not symmetrical in the XZ-plane. Instead, the height of the output section 126 is greater than its width, due to the inclusion of an extra row (or two) of waveguide segments.

A variety of optical media are suitable for use with the disclosed devices and methods. The optical medium in which the connector waveguides, mode enlargers and other disclosed devices are written may, but need not, be a monolithic or uniform substrate of material. That is, use of a single bulk substrate of one-piece construction may be advantageous, but not necessary. For instance, a single piece of glass or fused silica may simplify fabrication and involve lower costs in comparison with layered or composite substrates, or media requiring a dopant profile or complicated chemical composition.

In accordance with the method of fabrication described above, an optical connector for a waveguide configured to propagate a single-mode signal may include or involve applying ultrafast laser pulses to an optical medium to create a connector waveguide extending from a first end thereof positioned at a first face of the optical medium for permanent attachment to the waveguide toward a second end at a second face of the optical medium for a non-permanent connection, and applying further ultrafast laser pulses to the optical medium near the second end to create a section of the connector waveguide having an enlarged cross-section for generation of an expanded beam. In this way, the expanded beam can support propagation of the single-mode signal at the second end and through the non-permanent connection, while the connector waveguide has a cross-section at the first end matched to the waveguide to receive the single-mode signal.

In accordance with another aspect of the foregoing description, an optical connector for a waveguide configured to propagate a single-mode signal may include a monolithic optical medium of uniform composition having a first face for permanent attachment to the waveguide and a second face for a non-permanent connection, and a connector waveguide disposed in the optical medium. In turn, the connector waveguide may include a first end positioned at the first face, and a second end positioned at the second face for the non-permanent connection. The connector waveguide may have a cross-section matched to the waveguide at the first end to receive the single-mode signal carried by the waveguide, and enlarged at the second end to generate an expanded beam to support propagation of the single-mode signal through the non-permanent connection.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An optical connector for a waveguide configured to propagate a single-mode signal, the optical connector comprising:
   an optical medium having a first face for permanent attachment to the waveguide, a second face for a non-permanent connection, and a bulk region between the first and second faces; and
   a non-fiber, connector waveguide disposed in the bulk region to propagate the single-mode signal from the first face to the second face, the connector waveguide and the bulk region having a uniform chemical composition;
   wherein the connector waveguide is optically matched to the waveguide at the first face to receive the single-mode signal carried by the waveguide, wherein the connector waveguide comprises a taper section configured such that the connector waveguide is enlarged at the second face to support an expanded beam of the single-mode signal for propagation through the non-permanent connection, and wherein the taper section comprises a plurality of waveguide segments.

2. The optical connector of claim 1, wherein plurality of waveguide segments carry the single-mode signal collectively as an ensemble having a cross-section, and wherein the cross-section is enlarged through the taper section to support the expanded beam.

3. The optical connector of claim 2, wherein a transverse spacing between adjacent waveguide segments in the plurality of waveguide segments increases to enlarge the cross-section of the ensemble.

4. The optical connector of claim 2, wherein the plurality of waveguide segments are disposed such that a varying number of constituent segments carry the single-mode signal as the cross-section of the ensemble is enlarged.

5. The optical connector of claim 1, wherein the connector waveguide comprises a plurality of discrete longitudinal segments of modified refractive index, the plurality of discrete longitudinal segments being configured to carry the single-mode signal collectively as an ensemble.

6. The optical connector of claim 5, wherein respective segments of the plurality of discrete longitudinal segments only run a portion of a length of the taper section.

7. The optical connector of claim 6, wherein the taper section has a transverse waveguide segment density that decreases along the length of the taper section to enlarge the connector waveguide and support the expanded beam.

8. The optical connector of claim 5, wherein:
the connector waveguide comprises an output section between the taper section and the second face and further comprises a lens-like structure between the taper section and the output section for aiding in a transition of the expanded beam into the output section or collimation into free-space beyond the second face; and
the lens-like structure comprises a further plurality of discrete longitudinal segments of modified refractive index that effects a waveguide segment density higher than that of respective portions of the taper section and the output section adjacent to the lens-like structure.

9. The optical connector of claim 5, wherein:
the connector waveguide comprises an input section between the first face and the taper section and further comprises a lens-like structure between the input section and the taper section as a transition to the taper section; and
the lens-like structure comprises a further plurality of discrete longitudinal segments of modified refractive index that effects a waveguide segment density lower than that of respective portions of the input section and the taper section adjacent to the lens-like structure.

10. The optical connector of claim 1, wherein the connector waveguide further comprises an output section following the taper section, and wherein the output section comprises a birefringence-inducing stressor to preserve polarization of the single-mode signal.

11. The optical connector of claim 1, wherein the connector waveguide further comprises an output section following the taper section, and wherein the output section has a cross-sectional shape to preserve polarization of the single-mode signal.

12. The optical connector of claim 1, wherein the second face comprises a flat surface disposed around an end of the connector waveguide to promote angular alignment for the non-permanent connection.

13. The optical connector of claim 12, wherein the flat surface accommodates a two-dimensional connector waveguide array disposed in the optical medium and wherein the connector waveguilde array comprises the connector waveguide.

14. The optical connector of claim 12, wherein the second face comprises either a projection or a depression from the flat surface to promote alignment for the non-permanent connection.

15. The optical connector of claim 1, wherein the connector waveguide is one of a plurality of waveguides disposed in the bulk region of the optical medium.

16. An optical device for propagation of a single-mode signal, the optical device comprising:
an optical medium having a first face, a second face, and a bulk region between the first and second faces; and
a waveguide disposed in the bulk region to propagate the single-mode signal from the first face to the second face, the waveguide and the bulk region having a uniform chemical composition;
wherein the waveguide comprises:
an input section disposed at the first face to receive the single-mode signal;
a taper section disposed in a bulk of the optical medium having a uniform chemical composition, the taper section being configured to receive the single-mode signal from the input section to generate an expanded or narrowed beam of the single-mode signal via discrete modulation of waveguide cross-section, wherein the taper section comprises a plurality of waveguide segments; and
an output section to support the propagation of the expanded or narrowed beam of the single-mode signal.

17. The optical device of claim 16, wherein a transverse spacing between adjacent waveguide segments of the plurality of waveguide segments is modulated to provide the discrete modulation of the waveguide cross-section.

18. The optical device of claim 16, wherein the plurality of waveguide segments are disposed such that a varying number of constituent segments of the plurality of waveguide segments carry the single-mode signal as the waveguide cross-section is modulated.

19. The optical device of claim 16, wherein the connector waveguide comprises a plurality of discrete longitudinal segments of modified refractive index.

20. The optical device of claim 19, wherein respective segments of the plurality of discrete longitudinal segments only run a portion of a length of the taper section.

21. The optical device of claim 20, wherein the taper section has a transverse waveguide segment density that decreases along the length of the taper section to enlarge the connector waveguide and support adiabatic propagation of the beam.

22. A method of fabricating a mode enlarger for a single-mode signal propagating in a longitudinal direction while undergoing mode expansion transversely relative to the longitudinal direction, the method comprising the steps of:
generating an ultrashort laser beam; and
writing a taper section of the mode enlarger in an optical medium, the writing step comprising the step of forming a plurality of segments in the optical medium of modified refractive index using the ultrashort laser beam;
wherein the plurality of segments are arranged—
to act collectively as an ensemble to support propagation of the single-mode signal through the taper section, and
such that adjacent segment spacing in a direction transverse to the longitudinal direction varies in the taper section to enlarge the ensemble and support the mode expansion as the single-mode signal propagates through the taper section.

23. The method of claim 22, wherein the writing step further comprises the steps of:
terminating a first set of segments of the plurality of segments having a first transverse segment density; and
directing the ultrashort laser to write a second set of segments of the plurality of segments having a second transverse segment density lower than the first transverse segment density.

24. The method of claim 22, wherein the adjacent segment spacing is adjusted in discrete steps.

25. The method of claim 22, wherein the adjacent segment spacing is reflective of a distance between respective longitudinal center lines of adjacent segments of the plurality of segments.

26. The method of claim 22, wherein the writing step comprises establishing a spot size for the ultrashort laser beam such that adjacent segments of the plurality of segments overlap to form the ensemble for carrying the single-mode signal.

27. The method of claim 26, further comprising the step of adjusting the spot size of the ultrashort laser beam to modify an extent to which the adjacent segments overlap to adjust the adjacent segment spacing.

28. The method of claim 22, further comprising the step of adjusting a writing speed for the writing step to control the modified refractive index.

29. The optical connector of claim 1, wherein the bulk of the optical medium is a fused silica substrate.

30. The optical device of claim 16, wherein the bulk of the optical medium is a fused silica substrate.

* * * * *